Oct. 28, 1958   F. L. EASTMAN   2,858,388
ELECTRO-MECHANICAL SWITCHING APPARATUS.
Filed Dec. 23, 1955
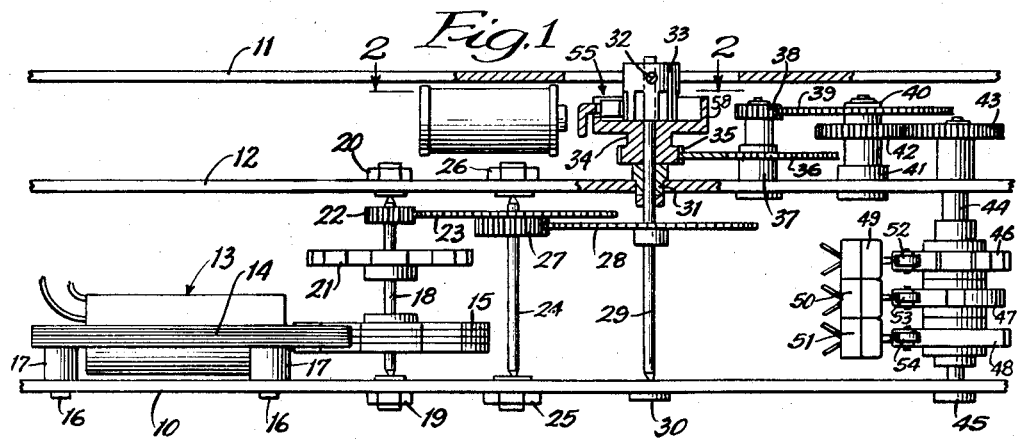
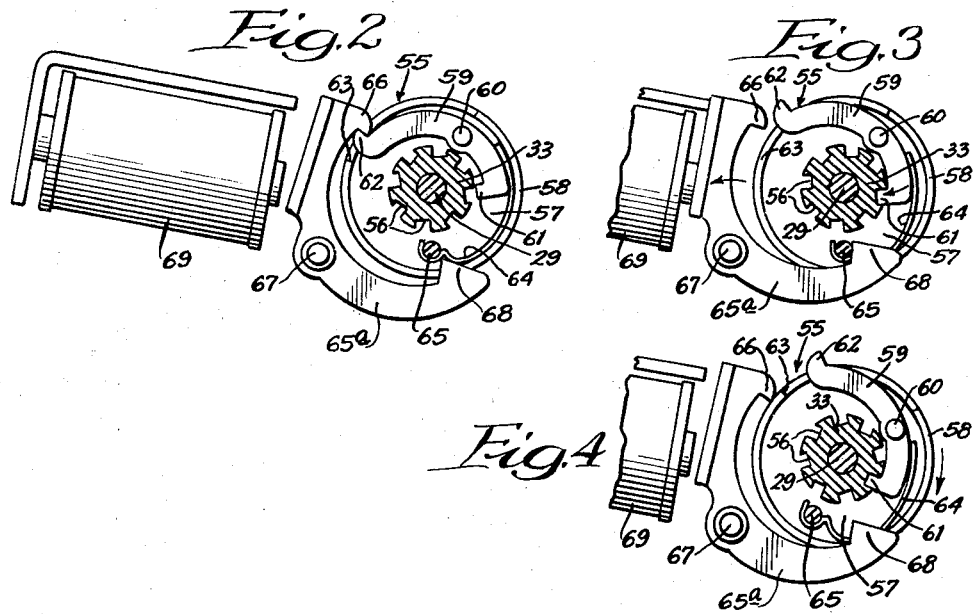
INVENTOR:
Fred L. Eastman,
BY
Dawson, Tilton & Graham,
ATTORNEYS.

United States Patent Office 2,858,388
Patented Oct. 28, 1958

2,858,388

ELECTRO-MECHANICAL SWITCHING APPARATUS

Fred L. Eastman, Chicago, Ill., assignor to Compco Corporation, Chicago, Ill., a corporation of Illinois Application December 23, 1955, Serial No. 554,962

10 Claims. (Cl. 200—38)

This invention relates to an electro-mechanical switching apparatus, and more particularly to apparatus for controlling a sequence function. The invention is useful in programming and wherever else consecutive switching is required, and especially where a switching sequence is selected and initiated by input pulses.

The control of a sequence function is an important operation in many types of automatic systems, machinery systems for example. By sequence function is meant a series of operations that are carried on in a predetermined order with respect to each other, and in a cyclic operation of predetermined length. In certain control apparatus, the selection and initiation of the sequence function is actuated by an input pulse. The pulse may be of extremely short duration, and it is desired to make the control of the sequence function independent of the duration of the actuating pulse after the pulse has set the system in operation. In the past, the control apparatus has been heavy, complex, inefficient and, in some cases, wholly unsatisfactory. Such prior control apparatus has involved the use of a plurality of relays, which by their nature cause serious maintenance problems, are heavy, require extensive and intricate wiring arrangements, are somewhat unstable in that they are affected by voltage variations, and where a plurality thereof are used in a single arrangement, place limits on the speed of a cyclic operation for where a plurality of short pulses are used as the actuating means, the relays or solenoids are unable to shift rapidly enough from one condition to another to satisfy the pulse durations.

It is, accordingly, an object of this invention to provide an improved apparatus for controlling a sequence function, and that is simple, compact, light-weight and that provides fast, positive action. Another object of the invention is in the provision of pulse-actuated sequence switching apparatus that, when once actuated, completes an operational cycle of predetermined character independently of the duration of the actuating pulse. Still another object is that of providing a switching system wherein a plurality of switches are actuated in a predetermined sequence by means of cams which are coupled to a drive means by a clutch energized by the receipt of periodic actuating pulses. A further object is the provision of a system as described wherein the drive means comprises a drive gear continuously driven, and an intermittently powered driven gear coupled to the cams—the drive and driven gears being periodically clutched by the energization of a solenoid responsive to input actuating pulses. Additional objects and advantages will become apparent as the specification is developed.

An embodiment of the invention is illustrated in the accompanying drawing, in which—

Figure 1 is a longitudinal sectional view showing a system embodying the invention; Figure 2 is a horizontal sectional view taken along the line 2—2 of Figure 1; Figure 3 is a broken horizontal sectional view similar to that of Figure 2, but showing the clutch in a different position; and Figure 4 is a broken horizontal sectional view similar to those of Figures 2 and 3, but showing the clutch or coupling in still another position.

In the environmental setting for the invention as shown, a plurality of support plates are provided, the lower of which is designated with the numeral 10, the upper with the numeral 11, and the intermediate support plate with the numeral 12. Mounted on the lower plate 10 is a motor designated generally with the numeral 13, having a stator assembly 14 and a rotor 15. The motor is mounted on the plates by cap screws 16 and spacers 17. The rotor 15 is mounted on a shaft 18 pivotally supported at its lower end in a bearing 19 carried by the lower plate 10, and pivotally supported at its upper end in a bearing 20 carried by the intermediate plate 12.

Intermediate the ends of the shaft 18 is a gear 21 that may be used to drive other components associated with the system herein being considered, but which have no particular importance insofar as a disclosure of the instant invention is concerned. Adjacent its upper end, the shaft 18 carries a gear 22 having a relatively small diameter that meshes with a gear 23 of considerably larger diameter carried by a shaft 24 journaled for rotation at its lower end in a bearing 25 supported by the plate 10, and at its upper end in a bearing 26 supported in the plate 12. Below the enlarged gear 23 and secured to the shaft 24, is a smaller gear 27 that meshes with a relatively large gear 28 locked on a shaft 29 rotatably supported at its lower end in a bearing 30 carried by the plate 10. The shaft 29 extends upwardly through the intermediate plate 12 wherein it is supported for rotation in a bearing 31, and therebeyond through the top plate 11.

Pinned to the shaft 29 adjacent the upper end thereof by a set screw 32 is a drive gear 33. The gear 33 is continuously driven (that is, rotates continuously) through the gear train comprising the gears 22, 23, 27 and 28. The diameters of these gears may be selected so as to rotate the drive gear 33 at any desired velocity. The drive motor 13 may be of any suitable type and, for example, may be a synchronous motor.

Mounted for rotational movement relative to the shaft 29, and about the longitudinal axis thereof, is a driven gear designated generally with the numeral 34. The driven gear 34 has a gear segment 35 that meshes with an enlarged gear 36 supported for rotation in a bearing 37 carried by the intermediate plate 12. The gear 36 is equipped with a shaft that extends upwardly, and at its upper end has locked thereon a gear 38 of reduced diameter that meshes with an enlarged gear 39 carried by a shaft 40 supported for rotation in a bearing 41 that is mounted on the intermediate plate 12. The shaft 40 below the gear 39 carries a further gear 42 of reduced diameter that meshes with a gear 43 of substantially the same diameter carried by a shaft 44 extending through the plate 12 and being journaled for rotation therein. The gears 36, 38, 39, 42 and 43 comprise a gear train that drivingly couples the driven gear 34 and the shaft 44.

The shaft 44 extends downwardly through the plate 10 wherein it is journaled for rotation in a bearing 45. Carried by the shaft 44 intermediate the lower plate 10 and plate 12 are a plurality of cams designated, respectively, with the numerals 46, 47 and 48. These cams are locked on the shaft 44 so that they are rotated thereby. The cams 46 through 48, respectively, are arranged to actuate the switches 49, 50 and 51. Each of these switches is equipped with lead lines adapted to be connected to equipment, the sequential operation of which is controlled by actuation of the switches. Each of the switches carries a trigger or cam follower member that rides on its respective cam, and the cam followers are designated for identification with the numerals 52, 53 and 54.

As is shown in Figure 1, the cams 46, 47 and 48 are each provided at spaced points about the circumferential surface thereof with a plurality of notches or grooves. The cam 48 has the order of highest rank and has two notches in the surface thereof, the cam 47 is of next highest rank and has four equally spaced apart notches in the surface thereof, while the cam 46 has eight notches equally spaced thereabout. Therefore, when the cam 48 has rotated through 360°, the switch 51 associated therewith has been actuated twice, while during that same rotation the switch 50 was actuated four times, and switch 49 actuated eight times. Thus, it will be apparent that the apparatus controlled by the switches 49, 50 and 51 will be energized in a predetermined sequence with respect to each other. The switches may be normally "on" or normally "off," depending upon the construction thereof, and in the specific illustration the switches are "off" until the cam followers thereof ride down into the grooves or notches of the actuating or switch cams.

As has been brought out before, the driven gear 34 and the drive gear 33 are adapted to be periodically or cyclically coupled by a cam assembly that is designated generally with the numeral 55. The clutch 55 comprises a driver that is formed by notching the lower end portion of the drive gear 33, as is shown most clearly by the numerical designations 56 given to these notches. The notches are equally spaced about the circumferential surface of the drive gear 33, and in the specific illustration given, there are eight notches. Pivotally mounted within a chamber or compartment 57 defined by an annular flange 58 extending upwardly from the driven gear 34, is a pawl or coupler 59 that is arcuate in configuration so that it conforms generally to the configuration of the annular flange 58. The pawl 59 is pivotally mounted intermediate its ends on a pivot pin 60, and at one end is provided with an inwardly turned ear or tongue 61 adapted to be received within the notches 56 that comprise the driver of the clutch assembly. The other end of the pawl 59 is turned outwardly to provide an ear 62 that extends outwardly beyond the dimensional limits of the flange 58 through a slot or channel 63 cut in a wall portion thereof. The pawl 59 is biased by a leaf spring 64 so that the tongue 61 is urged toward the notches 56. The leaf spring 64 is anchored in position along the inner wall of the flange 58 by a post or cam follower 65 rigidly secured to the driven wheel 34 and extending upwardly therefrom within the compartment 57.

Ordinarily, the pawl 59 is locked out of the notches 56 by a lockout element or arcuate arm 65a having at one end an ear 66 adapted to engage the ear 62 of the pawl, as is shown in Figure 2. The arcuate lockout arm is pivotally mounted intermediate the ends thereof on a pivot post 67 carried by the plate 12. The arm 65a, at the other end thereof, has an inwardly extending protuberance or cam follower portion 68. Triggering means are provided for shifting the arm 65a from the position shown in Figure 2, which may be termed the lockout position, to the one shown in Figure 3 which enables the drive and driven elements or gears to be coupled together in driving relation. Such means may take varied forms and, for example, may comprise a mechanical triggering device wherein a push-pull lever connected to the arm is actuated by a cam. In the specific illustration given, however, such means comprises a solenoid 69 which is mounted on the upper plate 11, and is positioned so as to control the lockout arm 65a. When the solenoid is energized, it is adapted to pivot the lockout arm into the position shown in Figure 3.

In operation of the system, the condition of the components is initially as shown in Figures 1 and 2. The motor 13 is energized, thereby driving the shaft 29 through the gear train 22, 23, 27 and 28. The motor operates continuously and, therefore, the drive gear 33 which is mounted upon the shaft 29 rotates continuously. The solenoid 69 is deenergized, and the lockout arm 65a is then in the position shown in Figure 2, wherein the ears 62 and 66 are interlockingly engaged whereby the pawl 59 is pivoted against the biasing action of the leaf spring 64 to maintain the tongue 61 in withdrawn relation with respect to the notches 56. As a result, the driven gear 34 is stationary, as are the cams 46, 47 and 48 which are coupled thereto through the gear train 36, 38, 39, 42 and 43.

It is apparent that since the ears 62 and 66 interlockingly engage only at one position, the cams 46, 47 and 48 always stop at a predetermined position with respect to the cam followers riding thereon. In the arrangement illustrated, these cam followers are spaced between the notches of the cams when the cams terminate their rotation, and the switches 49, 50 and 51 are thereby deactuated. This condition is maintained until a triggering pulse is received for energizing the solenoid 69.

When such a triggering or actuating pulse is received and the solenoid is energized, it is operative to pivot the lockout arm 65a in a counter-clockwise direction so as to free the ears 62 and 65 from each other. When that movement is accomplished, the leaf spring 64 is operative to urge the tongue 61 of the pawl into one of the notches 56. The condition of the clutch when the solenoid becomes energized is illustrated in Figure 3. Figure 3 also shows that the driven gear 34 has rotated sligthly in a clockwise direction, whereby the ear 62 is advanced angularly from the ear 66.

The drive gear 33 is now clutched to the driven gear 34, and through the gear train described the cams 46, 47 and 48 are rotated. These cams will be rotated through one cycle of operation, that cycle being defined by the operation of the clutch 55. Of couse, the cams will continue to rotate for as long as the solenoid continues to be energized, for while energized it is operative to hold the lockout arm in the position in Figure 3 whereat the drive gear 33 is locked with the driven gear 34. However, the system is actuated by pulses of short duration—or, stated another way, is repetitiously triggered. Therefore, it is only instantaneously energized and then immediately becomes deenergized. It should be noted that the lockout arm 65a is not biased in either direction. Therefore, after the solenoid is energized, the lockout arm will tend to be maintained in the position shown in Figure 3 even though the solenoid is deenergized. However, means are provided for camming the arm 65a toward the position shown in Figure 2, and such means will now be described.

If reference is made to Figure 3, it is seen that upon energization of the solenoid to pivot the lockout arm 65a in a counter-clockwise direction, the protuberance or cam element 68 carried at the end of the arm projects inwardly over the flange 58 of the driven wheel. The post or cam 65 extends upwardly to an elevation such that it is engageable with the protuberance 68. The protuberance and cam are so arranged that the protuberance moves inwardly behind the cam 65 when the solenoid is first energized, as shown in Figure 3. Since the driven wheel moves in a clockwise direction (as viewed in Figures 2 through 4), the inward protuberance does not impede free rotation of the driven wheels. It should be noted in Figure 4, that even though the lockout arm 65a tends to pivot in a clockwise direction after the solenoid 69 is deenergized, it cannot move inwardly to the extent that the ear 62 would interfere with free rotation of the driven wheel, because that ear then rides along the outer surface of the flange 58. Figure 4 shows this most clearly.

Once the driven wheel 34 has made substantially a complete rotation so as to bring the post or cam 65 adjacent the protuberance 68, that post engages the protuberance or cam surface and cams the lockout arm in a clockwise direction as the post rotates therepast. To facilitate this movement, it is noted that the end surface of the protuberance is inclined slightly so that the post 65 and the cam element or protuberance form, in effect, a cam and cam follower, whereby the lockout arm is pivoted in a clockwise direction. At this time, the driven wheel is not quite, but just about, in the position shown in Figure 2, and from that illustration it will be apparent that when the cam post 65 engages the protuberance 68, the ear 66 falls within the slot 63 so that it is free to move inwardly therethrough.

Since the tongue 61 of the pawl is within one of the notches 56, the driven gear 34 continues to rotate until the locking ear 62 of the pawl engages the ear 66 of the lockout arm. Upon interlocking engagement of these ears, the pawl 59 is pivoted in a counter-clockwise direction, as viewed in Figure 2, whereby the tongue 61 is withdrawn from the notch. Therefore, the driven wheel is declutched from the drive wheel or gear. This operation is repeated repetitiously upon the recept of actuating pulses by the solenoid 69. It is apparent that one complete rotation of the driven wheel or gear 34 is afforded upon each actuation or energization of the solenoid 69, and that complete rotation occurs independently and irrespectively of the duration of the pulse that energizes the solenoid. The pulse need only be of such duration and magnitude that the lockout arm 65a is pivoted in a counter-clockwise direction to disengage the locking ears 66 and 62.

It should be appreciated from what has been disclosed that the systems operates to control a sequence function, and the control is accomplished through use of a single solenoid and a clutch controlled thereby for coupling a driven and a drive gear—the switching sequence being provided by the plurality of cams and the switches arranged therewith.

While in the foregoing specification an embodiment of the invention has been descirbed in considerable detail for purposes of illustration, it will be apparent to those skilled in the art that numerous changes may be made in those details without departing from the spirit and principles of the invention.

I claim:

1. In a system of the character described wherein a plurality of switches are actuated in a predetermined sequence, a plurality of switch cams for actuating such switches, a driven gear coupled to said cams for driving the same, a drive gear, drive means therefor, and clutch means responsive to an actuating pulse for coupling said driven and drive gears for a period substantially longer than the duration of said actuating pulse said clutch means comprising a plurality of notches provided by said drive gear, a coupling member carried by said driven gear and having a tongue adapted to interlock with said notches, a lockout arm for controlling the position of said coupling element, and a solenoid for controlling said lockout arm, said solenoid being responsive to actuating impulses so as to be energized thereby.

2. A gear train adapted to couple a source of rotative power to a rotatable switch-actuating means, comprising a plurality of gears operatively associated to form said train, two of said gears being coaxially disposed, one of said coaxially disposed gears being a drive gear and positioned nearer said power source than the other and being fixedly secured to a shaft disposed axially thereof, the other of said gears being a driven gear and mounted on said shaft and in rotatable relation therewith, and clutch means associated with said two gears for coupling said gears together upon receipt by said means of an actuating pulse, said coupling persisting for one revolution of said driven gear, said clutch means comprising a plurality of notches provided by said drive gear, a coupling member carried by said driven gear and having a tongue adapted to interlock with said notches, a lockout arm for controlling the position of said coupling element, a solenoid for controlling said lockout arm, said solenoid being responsive to actuating impulses to move said lockout arm for engagement with said coupling whereby said coupling element interlocks with one of said notches, and cam means carried by said driven element engageable with said lockout arm after about one revolution of said driven gear to re-engage said lockout arm and said coupling element.

3. A gear train of the character set forth in claim 2, wherein the said coupling persists for one revolution of said driven gear, and said clutch means comprises a plurality of notches provided by said drive gear, a coupling member carried by said driven gear and having a tongue adapted to interlock with said notches, a lockout arm for controlling the position of said coupling element, a solenoid for controlling said lockout arm, said solenoid being responsive to actuating pulses to move said lockout arm from engagement with said coupling element whereby said coupling element interlocks with one of said notches, and cam means carried by said driven element engageable with said lockout arm after about one revolution of said driven gear to re-engage said lockout arm and said coupling element.

4. In a cam driving structure of the character described, a clutch assembly adapted to selectively couple a drive gear and a driven gear, said clutch assembly comprising a solenoid adapted to be energized by actuating pulses of predetermined character, a coupling pawl carried by said driven gear and being mounted for swinging movement between a coupling position wherein it rigidly arrests relative movement of said drive gear and a lockout position wherein the drive gear is free to rotate relative to said driven gear, and a lockout arm normally engageable with said coupling pawl to hold it in lockout position but being responsive to the energization of said solenoid to release said coupling pawl, said coupling pawl being biased toward coupling position wherein it rigidly arrests relative movement between the drive gear and driven gear said lockout arm being provided with a cam follower and said driven gear being provided with a cam, said cam and cam follower elements being operative to condition said lockout arm for engagement with said coupling pawl.

5. In clutch apparatus adapted for use in selectively coupling a drive element and driven element, said driven element being adapted when coupled to said drive element to actuate a plurality of switching cams for controlling a sequential switching operation, said driven element being equipped with a spring biased coupling member shiftable between two positions, the first a coupling position wherein it rigidly arrests independent rotation of said drive element with respect to said driven element and the other a lockout position wherein free relative movement between said drive element and driven element is afforded, and a solenoid-controlled lockout arm operative, when the solenoid is deenergized, to hold said coupling arm in lockout position and being shifted free of said coupling member when said solenoid is energized said lockout arm being mounted independently of said drive and driven elements and actuatable by said driven element when said driven element is rotating whereby said lockout arm stops further rotation of said driven element.

6. Apparatus of the character set forth in claim 5, wherein said drive element is provided with a plurality of coupling member receiving notches.

7. The structure of claim 5 in which said driven element is provided with an upwardly extending annular flange defining a compartment in which said coupling member is mounted, said flange having a channel formed in a wall portion thereof, said coupling member having a locking ear movable through said channel, and said lockout member having a locking ear movable through said channel for lockingly engaging the ear of said coupling member, said ears being normally in locking engagement but being free of each other when said solenoid is energized.

8. The structure of claim 7 in which said driven element carries an upwardly extending cam post positioned within said compartment, and in which said lockout arm carries an inwardly projecting protuberance forming a cam element engageable with said cam post after said solenoid has been energized and subsequently deenergized and after said driven element has rotated through an arc length of predetermined distance to shift said lockout arm to move the ear thereof into a position for interlockingly engaging the ear of said coupling member.

9. In apparatus for controlling a switching sequence in response to actuating pulses, a drive gear, motor means coupled thereto for continuously rotating the same, a driven gear, a plurality of switching cams adapted upon actuation to trigger, in a predetermined sequence, a plurality of switches, gear train means drivingly coupling said driven element and said cams, a solenoid energized by actuating pulses, a pivotally supported lockout arm responsive to the energized condition of said solenoid and being generally arcuate and having at one end a locking ear and at its other end a cam follower segment, said driven element being equipped with an outwardly extending annular flange having a channel formed in a wall section thereof, a cam post carried by said driven element and upon rotation thereof cammingly engaging said cam follower segment to shift said lockout arm opposite to the direction of movement thereof effectuated by energization of said solenoid, a generally arcuate coupling member pivotally supported on said driven element and having at one end a locking ear and at its other end an inwardly projecting tongue, said drive gear having a plurality of notches formed in the peripheral surface thereof each adapted to receive said tongue therein, and spring means biasing said coupling member in a direction to project said tongue into one of said notches, said locking ears each being movable through said channel and being interlockingly engageable with each other to hold said coupling member in a position wherein said tongue is withdrawn from said notches, the locking ear carried by said lockout arm being positioned to ride on the outer surface of said flange until aligned with said channel.

10. In a system of the character described wherein a plurality of switches are actuated in a predetermined sequence, a plurality of switch cams for actuating said switches, a driven gear coupled to said cams for driving the same, a drive gear, drive means therefor, said drive gear being provided with a plurality of notches, pawl means carried by said driven gear for engaging one of said notches to operatively couple said gears, and means for moving said pawl means into engagement with one of said notches, said last mentioned means being responsive to a signal substantially shorter than one rotation of said gears to move said pawl means.

References Cited in the file of this patent

UNITED STATES PATENTS

| | | |
|---|---|---|
| 396,632 | Waters | Jan. 22, 1889 |
| 1,761,774 | Carroll | June 3, 1930 |
| 1,765,527 | Gollnick et al. | June 24, 1930 |
| 1,987,742 | Lawrence | Jan. 15, 1935 |
| 2,323,411 | Newman | July 6, 1943 |

FOREIGN PATENTS

| | | |
|---|---|---|
| 530,482 | France | Oct. 3, 1921 |
| 865,406 | Germany | Feb. 2, 1953 |